(12) United States Patent
Luo et al.

(10) Patent No.: US 12,387,300 B2
(45) Date of Patent: Aug. 12, 2025

(54) IMAGE PROCESSING METHOD AND APPARATUS, COMPUTER DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Yuchen Luo, Shenzhen (CN); Junwei Zhu, Shenzhen (CN); Keke He, Shenzhen (CN); Wenqing Chu, Shenzhen (CN); Ying Tai, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 17/985,567

(22) Filed: Nov. 11, 2022

(65) Prior Publication Data

US 2023/0394633 A1 Dec. 7, 2023

Related U.S. Application Data

(63) Continuation of application No. PCT/CN2022/111736, filed on Aug. 11, 2022.

(30) Foreign Application Priority Data

Jun. 2, 2022 (CN) .......................... 202210626467.1

(51) Int. Cl.
*G06T 5/77* (2024.01)
*G06T 3/02* (2024.01)
(Continued)

(52) U.S. Cl.
CPC .................. *G06T 5/77* (2024.01); *G06T 3/02* (2024.01); *G06T 5/50* (2013.01); *G06V 10/761* (2022.01);
(Continued)

(58) Field of Classification Search
CPC .... G06T 5/77; G06T 3/02; G06T 5/50; G06T 2207/20081; G06T 2207/20084;
(Continued)

(56) References Cited

U.S. PATENT DOCUMENTS 10,552,977 B1 2/2020 Theis et al.
2023/0394633 A1* 12/2023 Luo ........................... G06T 5/50
2025/0028804 A1* 1/2025 Wexler ................... G10L 15/25

FOREIGN PATENT DOCUMENTS

CN 111783603 A 10/2020
CN 112581635 A 3/2021
(Continued)

OTHER PUBLICATIONS

Yuhao Zhu et al., "One Shot Face Swapping on Megapixels", Jun. 2021, p. 4834-4844, CVPR.
(Continued)

*Primary Examiner* — Bobbak Safaipour
(74) *Attorney, Agent, or Firm* — Anova Law Group, PLLC

(57) ABSTRACT

This application provides an image processing method and apparatus. The method includes acquiring an identity feature of a source image and an initial attribute feature of at least one measure of a target image in response to receiving a face change request; inputting the identity feature and the initial attribute feature of the at least one measure into a face change model; iteratively performing feature fusion on the identity feature and the initial attribute feature of the at least one measure by using the face change model to obtain a (Continued)

fusion feature; and generating a target face change image based on the fusion feature by using the face change model, and outputting the target face change image, a face in the target face change image being fused with an identity feature of the source face and a target attribute feature of the target face.

17 Claims, 5 Drawing Sheets

(51) Int. Cl.
  *G06T 5/50* (2006.01)
  *G06V 10/74* (2022.01)
  *G06V 10/82* (2022.01)
  *G06V 40/16* (2022.01)

(52) U.S. Cl.
  CPC ............ *G06V 10/82* (2022.01); *G06V 40/168* (2022.01); *G06T 2207/20081* (2013.01); *G06T 2207/20084* (2013.01); *G06T 2207/20221* (2013.01); *G06T 2207/30201* (2013.01)

(58) Field of Classification Search
  CPC . G06T 2207/20221; G06T 2207/30201; G06T 11/00; G06T 3/4038; G06T 3/4046; G06T 3/04; G06V 10/761; G06V 10/82; G06V 40/168; G06V 10/454; G06V 10/764; G06V 40/171; G06V 40/172; G06N 3/045; G06N 3/08
  See application file for complete search history.

(56) References Cited

FOREIGN PATENT DOCUMENTS

| CN | 112734634 | A | 4/2021 |
| CN | 112766160 | A | 5/2021 |
| CN | 112990123 | A | 6/2021 |
| CN | 112734634 | B | 7/2021 |
| CN | 113763366 | A | 12/2021 |
| CN | 114972016 | A | 8/2022 |

OTHER PUBLICATIONS

Tero Karras et al., "Analyzing and improving the image quality of StyleGAN", 2020, CVPR.
Gege Gao et al., "Information Bottleneck Disentanglement for Identity Swapping", Jun. 2021, p. 3404-3413, CVPR.
Tero Karras et al., "A Style-Based Generator Architecture for Generative Adversarial Networks", 2019, p. 4401-4410, CVPR.
Terro Karras et al., "Alias-Free Generative Adversarial Networks", 2021, NIPS.
Korean Intellectual Property Office (KIPO) Office Action 1 for 20227038636 Dec. 26, 2023 11 Pages (including translation).
Zhiliang Xu et al. "Facecontroller: Controllable attribute editing for face in the wild." Proceedings of the AAAI Conference on Artificial Intelligence. vol. 35. No. 4. 2021.
Longhao Zhang et al. "AP-GAN: Improving attribute preservation in video face swapping." IEEE transactions on circuits and systems for video technology 32.4 (2021): 2226-2237.
The World Intellectual Property Organization (WIPO) International Search Report for PCT/CN2022/111736 Feb. 10, 2023 11 Pages (including translation).
The European Patent Office (EPO) The Extended European Search Report for Application No. 22783415.7 Oct. 8, 2024 21 Pages.
Lingzhi Li et al. "Faceshifter: Towards high fidelity and occlusion aware face swapping." arXiv preprint arXiv:1912.13457 (2019).
The Japan Patent Office (JPO) Notice of Reasons for Refusal for Application No. 2022-565906 Aug. 13, 2024 4 Pages (including translation).

* cited by examiner

IMAGE PROCESSING METHOD AND APPARATUS, COMPUTER DEVICE, STORAGE MEDIUM, AND PROGRAM PRODUCT

RELATED APPLICATIONS

This application is a continuation of PCT Application No. PCT/CN2022/111736, filed on Aug. 11, 2022, which in turn claims priority to Chinese Patent Application No. 202210626467.1 filed on Jun. 2, 2022. The two applications are both incorporated herein by reference in their entirety.

FIELD OF THE TECHNOLOGY

This application relates to technical fields such as artificial intelligence, machine learning, and intelligent transportation, and in particular, to an image processing method and apparatus, a computer device, a storage medium, and a program product.

BACKGROUND OF THE DISCLOSURE

Face change is an important technology in the field of computer vision. Face change is widely used in a scenario such as content production, video portrait production, entertainment video production, virtual image, or privacy protection. Face change means replacing the face of an object in an image with another face.

SUMMARY

Embodiments of this application provide an image processing method and apparatus, a computer device, a computer readable storage medium, and a computer program product, which can improve image quality after face change.

An embodiment of this application provides an image processing method. The method includes acquiring an identity feature of a source image and an initial attribute feature of at least one measure of a target image in response to receiving a face change request, the face change request requesting to replace a target face in the target image with a source face in the source image, the identity feature representing an object to which the source face belongs, and the initial attribute feature representing a three-dimensional attribute of the target face; inputting the identity feature and the initial attribute feature of the at least one measure into a face change model; iteratively performing feature fusion on the identity feature and the initial attribute feature of the at least one measure by using the face change model to obtain a fusion feature; and generating a target face change image based on the fusion feature by using the face change model, and outputting the target face change image, a face in the target face change image being fused with an identity feature of the source face and a target attribute feature of the target face.

An embodiment of this application further provides a computer device, including: a memory and a processor; the memory being configured to store a computer program; and the processor being configured to execute the computer program stored in the memory, performing the image processing method provided in the embodiments of this application.

An embodiment of this application further provides a non-transitory computer-readable storage medium. The computer-readable storage medium stores a computer program, the computer program, when executed by a processor, implementing the image processing method provided in the embodiments of this application.

In the image processing method in the embodiments of this application, an identity feature of a source image and an initial attribute feature of a target image are inputted into a face change model, and the identity feature and an initial attribute feature of at least one measure are iteratively fused by using the face change model to obtain a fusion feature. That is, at an input end of the face change model, display decoupling is performed on the identity feature and the attribute feature, so that the obtained fusion feature is fused with an identity feature of an object in the source image and a three-dimensional attribute of an object face in the target image.

A target face change image is generated based on the fusion feature by using the face change model, and the target face change image is outputted. A face in the target face change image is fused with an identity feature of the source face and a target attribute feature of the target face. Accordingly, the target face change image is generated based on the fusion feature obtained by means of feature fusion, and on the basis of ensuring identity consistency between the face in the target face change image and the face in the source image, an attribute and a detail feature of the target face in the target face change image are effectively reserved, thereby greatly improving clarity, accuracy, and authenticity of the face in the face change image, and implementing high definition face change.

DESCRIPTION OF EMBODIMENTS

Figure 1:
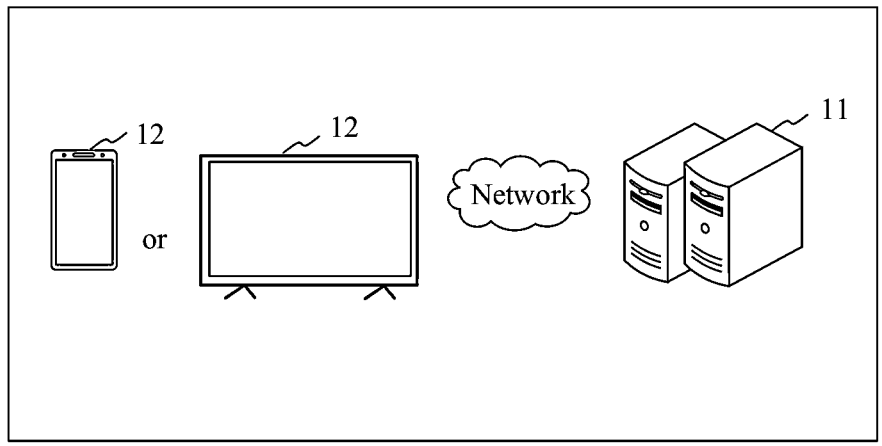
FIG. 1 is a schematic diagram of an implementation environment of an image processing method according to an embodiment of this application.

The following describes the embodiments of this application with reference to the accompanying drawings in the embodiments of this application. It is to be understood that the following embodiments described with reference to the accompanying drawings are exemplary descriptions used for explaining the technical solutions in the embodiments of this application, and the technical solutions in the embodiments of this application are not limited thereto.

In the following descriptions, related "some embodiments" describe a subset of all possible embodiments. However, it may be understood that the "some embodiments" may be the same subset or different subsets of all the possible embodiments, and may be combined with each other without conflict.

A person skilled in the art may understand that the singular forms "a", "an", "said", and "the" used herein may include the plural forms as well, unless the context clearly indicates otherwise. The terms "include" and "contain" used in the embodiments of this application refer to features, information, data, steps, and operations that may be presented by corresponding features, but are not excluded to be implemented as other features, information, data, steps, and operations that are supported in the art.

It may be understood that, in a specific implementation of this application, any data related to an object, such as at least one pair of samples in a sample data set used in a source image, a target image, a source face, a target face, and model training, and any data related to an object, such as a to-be-changed face image, a face feature of a target face, and an attribute parameter used when a face change model is used for face change are obtained after consent or permission of the related object is obtained. When the following embodiments of this application are applied to a specific product or technology, an object's permission or consent needs to be obtained, and related data collection, use, and processing need to comply with relevant laws and standards of a relevant country and region. In addition, a face change process performed on a face image of any object by using the image processing method in this application is a face change process that is triggered based on a face change service or face change request triggered by a related object, and is performed after permission or consent of the related object is obtained.

The image processing method provided in the embodiment of this application relates to the following technologies such as artificial intelligence and computer vision, for example, a process of implementing face change model training and extracting multi-measure attribute features in an image by using technologies such as cloud computing and big data processing in the artificial intelligence technology. For example, face recognition is performed on an image by using a computer vision technology, to obtain an identity feature corresponding to a face in the image.

Artificial Intelligence (AI) is a theory, method, technology, and application system that uses a digital computer, or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. An AI software technology includes fields such as a CV technology, a speech processing technology, a natural language processing technology, machine learning/deep learning (DL), automatic driving, and intelligent transportation.

CV is a science that studies how to use a machine to "see", and furthermore, that uses a camera and a computer to replace human eyes to perform machine vision such as recognition, and measurement on a target, and further perform graphic processing, so that the computer processes the target into an image more suitable for human eyes to observe, or an image transmitted to an instrument for detection. As a scientific discipline, computer vision deals with related theories and technologies in an attempt to create an artificial intelligence system capable of obtaining information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, map construction, automatic driving, and intelligent transportation, and further include biometric feature recognition technologies such as common face recognition and fingerprint recognition.

Face change is often implemented by using a neural network model, for example, an image is input into a neural network model used for face change, and an image obtained by performing face change on the image by using an output of the neural network model.

FIG. 1 is a schematic diagram of an implementation environment of an image processing method according to this application. As shown in FIG. 1, the implementation environment includes: a server 11 and a terminal 12.

The server 11 is configured with a trained face change model, and the server 11 may provide a face change function for the terminal 12 based on the face change model. The face change function may be used for generating a face change image based on a source image and a target image. The generated face change image includes an identity feature of a source face in the source image and an attribute feature of a target face in the target image. The identity feature represents an object to which the source face belongs, and the initial attribute feature represents a three-dimensional attribute of the target face.

In some embodiments, the terminal 12 is installed with an application program, the application program may be pre-configured with a face change function, and the server 11 may be a back-end server of the application program. The terminal 12 and the server 11 may exchange data based on the application program, so as to implement a face change process. For example, the terminal 12 may send a face change request to the server 11, where the face change request is used for requesting to replace the target face in the target image with the source face in the source image. Based on the face change request, the server 11 may perform the image processing method in this application to generate a target face change image, and return the target face change image to the terminal 12. For example, the application program is any application that supports the face change function. For example, the application program includes but is not limited to a video clipping application, an image processing tool, a video application, a live streaming application, a social application, a content interaction platform, a game application, and the like.

The cloud server may be an independent physical server, or may be a server cluster or a distributed system formed by a plurality of physical servers, or may be a cloud server or a server cluster that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The foregoing network may include but is not limited to a wired network and a wireless network, where the wired network includes: a local area network, a metropolitan area network, and a wide area network, where the wireless network includes Bluetooth, Wi-Fi, and another network that implements wireless communication. The terminal may be a smartphone (such as an Android mobile phone or an iOS mobile phone), a tablet computer, a notebook computer, a digital broadcast receiver, a mobile Internet device (MID), a personal digital assistant (PDA), a desktop computer, an in-vehicle terminal (such as an in-vehicle navigation terminal or an in-vehicle computer), a smart home appliance, an aircraft, a smart speaker, a smart watch, or the like. The terminal and the server may be directly or indirectly connected in a wired or wireless communication manner, but are not limited thereto. Details are specifically determined based on specific use scenario requirements, which is not limited herein.

To make the objectives, technical solutions, and advantages of this application clearer, the following further describes the embodiments of this application in detail with reference to the accompanying drawings.

Technical terms used in this application are described first:

Face change: is to change a face in an image to another face. For example, given a source image $X_s$ and a target image $X_t$, a face change image $Y_{s,t}$ is generated by using the image processing method in this application. The face change image $Y_{s,t}$ has an identity feature of the source image $X_s$; and also reserves an identity-independent attribute feature in the target image $X_t$.

Face change model: is used for replacing a target face in a target image with a source face in a source image.

Source image: is an image that provides an identity feature, where a face in the generated face change image has an identity feature of a face in the source image.

Target image: is an image that provides an attribute feature, and a face in the generated face change image has an attribute feature of a face in the target image. For example, the source image is an image of an object A, the target image is an image of an object B, and a face of the object B in the target image is replaced with a face of the object A to obtain a face change image. An identity of a face in the face change image is the face of the object A, identity features such as an eye shape, an eye spacing, and a nose size of the face in the face change image are the same as those of the object A, and the face in the face change image has attribute features such as an expression, hair, light, wrinkles, a pose, and a face occlusion of the object B.

Figure 2:
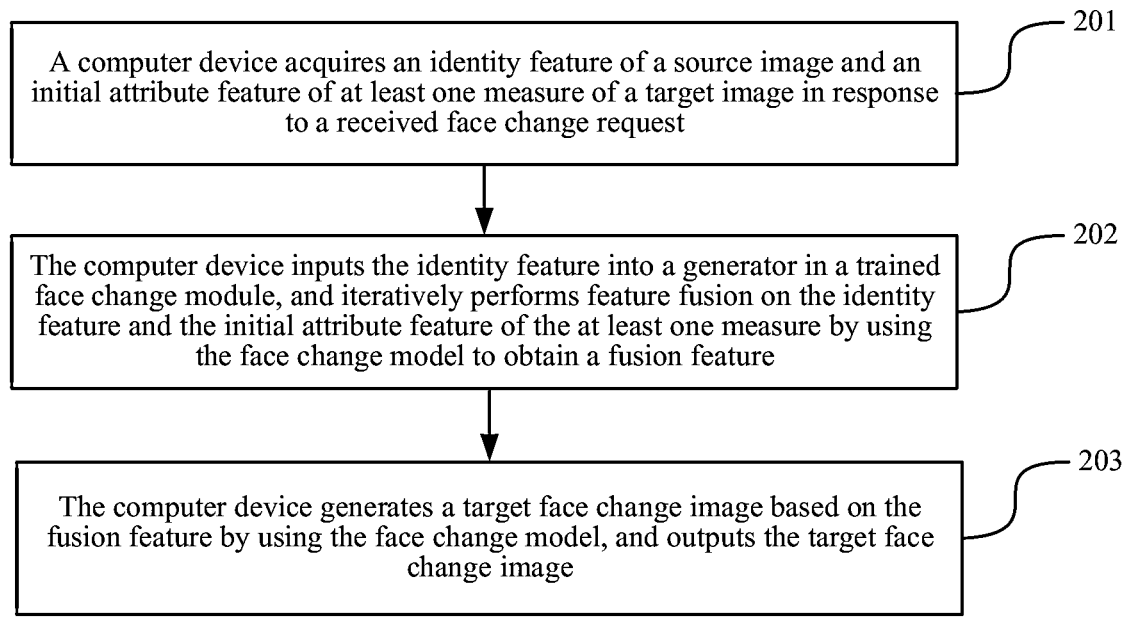
FIG. 2 is a schematic flowchart of an image processing method according to an embodiment of this application.

FIG. 2 is a schematic flowchart of an image processing method according to an embodiment of this application. The method may be performed by a computer device (may be a terminal or a server). As shown in FIG. 2, the method includes the following steps.

Step 201: The computer device acquires an identity feature of a source image and an initial attribute feature of at least one measure of a target image in response to a received face change request.

The face change request is used for requesting to replace a target face in the target image with a source face in the source image. In one embodiment, the face change request carries the source image and the target image. The computer device obtains the source image and the target image by parsing the face change request. Alternatively, the face change request carries an identifier of the source image and an identifier of the target image, and after parsing the face change request, the computer device obtains the identifier of the source image and the identifier of the target image, and finds the source image and the target image in an image library based on the identifiers.

The computer device may use a trained face change model to obtain a face change image, thereby providing a face change function. The identity feature represents an object to which the source face belongs. For example, the identity feature may be a feature that identifies an object, and the identity feature may include at least one of five sense organ features of the target face or an outline feature of the target face of the object. The five sense organ features of the target face are features corresponding to the five sense organs, and the outline feature of the target face is a feature corresponding to the outline of the target face. For example, the identity feature may include but is not limited to an eye shape, an eye spacing, a nose size, an eyebrow shape, a face outline, and the like. The initial attribute feature represents a three-dimensional attribute of the target face. For example, the initial attribute feature may represent attributes such as a pose and a spatial environment of the target face in a three-dimensional space. For example, the initial attribute feature may include but is not limited to a background, light, wrinkles, pose, expression, hair, facial occlusion, and the like.

In some embodiments, the face change model may include an identity recognition network, and the computer device may input the source image into the face change model, and perform face recognition on the source image by using the identity recognition network in the face change model to obtain the identity feature of the source image. For example, the identity recognition network is configured to recognize, based on the inputted image, an identity to which a face in the image belongs. For example, the identity recognition network may be a fixed face recognition network (Fixed FR Net) in the face change model. For example, when the source image is a face image, the identity recognition network may be a trained face recognition model, and the face recognition model is used for recognizing an object to which a face in the source image belongs, to obtain an identity feature used for identifying the object. The identity feature may include at least one of the following features: an eye shape feature, an eye spacing feature, a nose size feature, an eyebrow shape feature, and a face outline feature. The identity feature may be a feature vector of a fixed dimension outputted by the face recognition model, for example, an outputted 512-dimensional feature vector. The 512-dimensional feature vector may represent features such as an eye shape, an eye spacing, a nose size, an eyebrow shape, a face outline, and the like.

In some embodiments, the face change model further includes an attribute feature extraction network that may include an encoder and a decoder. The encoder includes at least one encoding network layer (e.g., including at least two encoding network layers), and the decoder includes at least one decoding network layer (e.g., including at least two decoding network layers). For example, the attribute feature extraction network is a U-shaped deep network including an encoder and a decoder. In one embodiment, the computer device may acquire the initial attribute feature of the at least one measure of the target image in the following manner:

The computer device performs layer-by-layer downsampling on the target image by using at least one encoding network layer of an encoder, to obtain an encoding feature; and performs, by using at least one decoding network layer of a decoder, layer-by-layer upsampling on the encoding feature to output decoding features of different measures, and uses the decoding feature of different measures outputted by the at least one decoding network layer as the initial attribute feature. Each decoding network layer corresponds to one measure.

For example, each encoding network layer is configured to perform an encoding operation on the target image to obtain an encoding feature, and each decoding network layer is configured to perform a decoding operation on the encoding feature to obtain an initial attribute feature. The decoder may perform a reverse operation at run time according to an operating principle of the encoder, for example, the encoder may perform downsampling on the target image, and the decoder may perform upsampling on a downsampled encoding feature. For example, the encoder may be an autoencoder (AE), and the decoder may be a decoder corresponding to the autoencoder.

Figure 3:
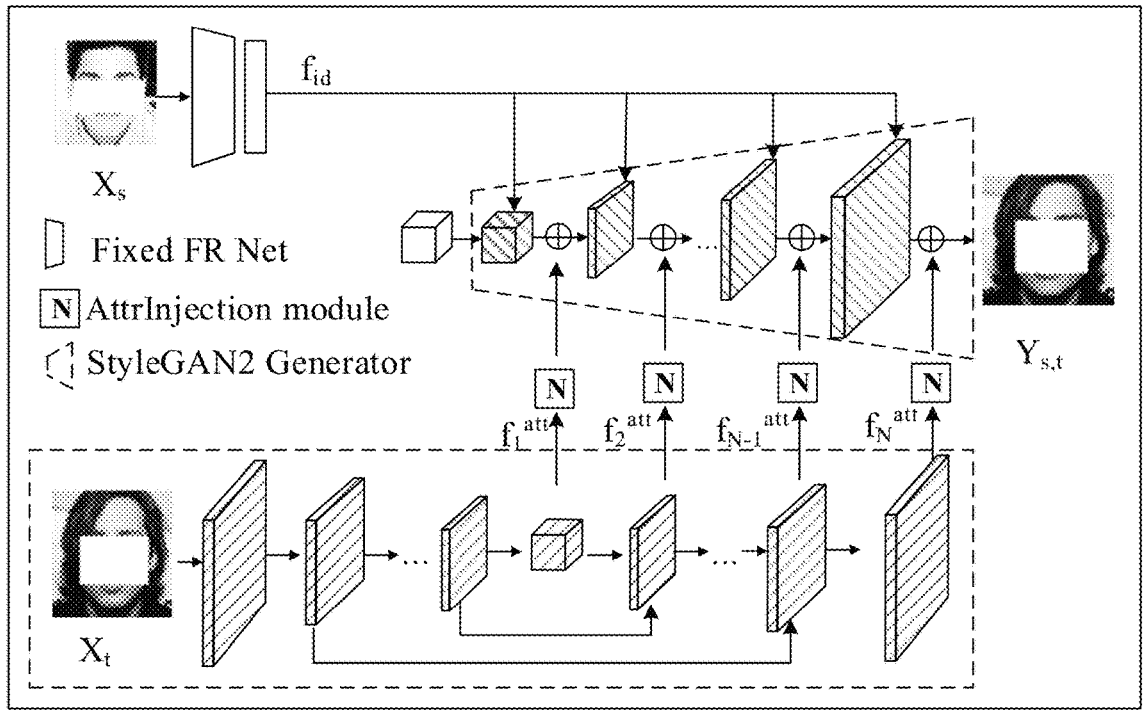
FIG. 3 is a schematic structural diagram of a face change model according to an embodiment of this application.

In some embodiments, each encoding network layer is configured to perform downsampling on an encoding feature outputted by a previous encoding network layer to obtain an encoding feature of at least one measure, where each encoding network layer corresponds to one measure; and each decoding network layer is configured to perform upsampling on a decoding feature outputted by a previous decoding network layer to obtain an initial attribute feature of at least one measure, each decoding network layer corresponds to one measure, and an encoding network layer and a decoding network layer at the same layer may have the same measure. Each decoding network layer may further upsample an initial attribute feature outputted by a previous decoding network layer with reference to an encoding feature of an encoding network layer of a corresponding measure. As shown in FIG. 3, a U-shaped deep network is configured to perform feature extraction on a target image $X_t$, for example, input the target image into an encoder. The encoder includes a plurality of (that is, at least two) encoding network layers, and each encoding network layer corresponds to a resolution (that is, a measure) of one feature map. Resolutions of outputted feature maps of an encoding feature of the target image $X_t$ are successively 1024×1024, 512×512, 256×256, 128×128, and 64×64. In this case, a feature map of 64×64 is inputted into the first decoding network layer of a decoder to obtain a decoded feature map of 128×128, and the decoded feature map of 128×128 is concatenated with an encoded feature map of 128×128, and then a concatenated feature map is upsampled to obtain a decoded feature map of 256×256. By analogy, feature maps of various resolutions obtained by decoding a network structure of a U-shaped deep network are used as an initial attribute feature. In the initial attribute feature, an initial attribute feature of each measure is used for representing an attribute feature of the target image at a corresponding measure, and attribute features corresponding to initial attribute features of different measures may be different. An initial attribute feature of a relatively small measure can represent information such as a global position and posture of a target face in the target image, and an initial attribute feature of a relatively large measure can represent local details of the target face in the target image, so that the initial attribute feature of the at least one measure can encompass attribute features of a plurality of levels of an object. For example, the initial attribute feature of the at least one measure may be a plurality of feature maps with resolutions ranging from small to large, a feature map of a resolution R1 may represent a face position of the target face in the target image, a feature map of a resolution R2 may represent a pose expression of the target face in the target image, and a feature map of a resolution R3 may represent facial details of the face position of the target face in the target image. The resolution R1 is less than R2, and R2 is less than R3.

Step 202: The computer device iteratively performs feature fusion on the identity feature and the initial attribute feature of the at least one measure by using the face change model to obtain a fusion feature.

Step 203: The computer device generates a target face change image based on the fusion feature by using the face change model, and outputs the target face change image.

Herein, a face in the target face change image is fused with an identity feature of the source face and a target attribute feature of the target face.

In some embodiments, the face change model includes a generator that includes at least one convolutional layer (e.g., including at least two convolutional layers), the at least one convolutional layer is connected in series, and each convolutional layer corresponds to a measure. By using the face change model, the computer device may iteratively perform feature fusion on the identity feature and the initial attribute feature of the at least one measure in the following manner to obtain the fusion feature:

The computer device separately performs the following processing on the identity feature and the initial attribute feature of the corresponding measure by using each convolutional layer of the face change model: acquiring a first feature map outputted by a previous convolutional layer of a current convolutional layer; generating a second feature map based on the identity feature and the first feature map, and selecting a target attribute feature from the initial attribute feature of the at least one measure, the target attribute feature being a feature other than an identity feature of the target face; and generating a third feature map based on the target attribute feature and the second feature map, the third feature map being a first feature map of a next convolutional layer of the current convolutional layer; and determining, as the fusion feature, a third feature map outputted by the last convolutional layer in the at least one convolutional layer.

In one embodiment, both the initial attribute feature and a quantity of convolutional layers are a target quantity, the convolutional layers of the target quantity are connected in series, different initial attribute features are corresponding to different measures, each convolutional layer is corresponding to an initial attribute feature of one measure, and the target quantity is greater than or equal to two; and an initial feature map is acquired when the current convolutional layer is the first convolutional layer in the convolutional layers of the target quantity, and the initial feature map is used as a first feature map inputted to the current convolutional layer. Herein, in one embodiment, the initial feature map may be an all-0 feature vector in a fixed dimension.

In some embodiments, the computer device may select the target attribute feature from the initial attribute feature of the at least one measure in the following manner: determining, based on the feature map and the attribute feature, a control mask of the image at a corresponding measure, where the control mask is used for representing a pixel that carries a feature other than the identity feature of the target face; and screening the initial attribute feature of the at least one measure based on the control mask to obtain the target attribute feature.

For example, the computer device may input the identity feature to each convolutional layer of the generator. The computer device inputs the initial attribute feature of the at least one measure into a convolutional layer that is in the generator and that matches the measure of the initial attribute feature. Measures of feature maps outputted by convolutional layers of the generator are different, and a convolutional layer that matches the measure of the initial attribute feature means that a measure of a feature map to be outputted by the convolutional layer is the same as the measure of the initial attribute feature. For example, a convolutional layer in the generator is used for processing a feature map of 64×64 from a previous convolutional layer, and outputting a feature map of 128×128, and an initial attribute feature of 128×128 may be inputted into the convolutional layer.

In some embodiments, in the generator, the computer device may determine a control mask of the at least one measure of the target image based on the identity feature and the initial attribute feature of the at least one measure, and obtain the target face change image based on the identity feature, the control mask of the at least one measure, and the initial attribute feature of the at least one measure. For example, the control mask represents a pixel that carries a feature other than the identity feature of the target face, and the computer device may determine the target attribute feature of the at least one measure based on the control mask and the initial attribute feature of the at least one measure, and generate the target face change image based on the identity feature and the target attribute feature of the at least one measure.

The computer device may obtain the target face change image by performing layer-by-layer processing on each convolutional layer of the generator. In a possible example, the computer device performs the following steps S1 to S4 on the inputted identity feature and the initial attribute feature of the corresponding measure by using each convolutional layer of the generator:

Step S1: The computer device acquires a first feature map outputted by a previous convolutional layer of a current convolutional layer.

In the generator, each convolutional layer may process the feature map outputted from a previous convolutional layer and output it to a next convolutional layer. For the first convolutional layer, the computer device may input an initial feature map to the first convolutional layer. For example, the initial feature map may be an all-0 feature vector of 4×4× 512. For the last convolutional layer, the computer device may generate a final target face change image based on a feature map outputted by the last convolutional layer.

Step S2: The computer device generates a second feature map based on the identity feature and the first feature map, and determines a control mask of the target image at a corresponding measure based on the second feature map and the initial attribute feature.

The control mask represents a pixel that carries a feature other than the identity feature of the target face.

In some embodiments, the computer device adjusts a weight of a convolution kernel of the current convolutional layer based on the identity feature, and obtains the second feature map based on the first feature map and the adjusted convolution kernel. For example, the step of generating the second feature map by the computer device may include: The computer device performs affine transform on the identity feature to obtain a first control vector; and the computer device maps a first convolution kernel of the current convolutional layer to a second convolution kernel based on the first control vector, and performs a convolution operation on the first feature map based on the second convolution kernel to generate the second feature map. For example, the identity feature may be represented as an identity feature vector, and affine transform is an operation of performing linear transform and translation on the identity feature vector to obtain the first control vector. The affine transform operation includes but is not limited to translation, scaling, rotation, and inversion transform. Each convolutional layer of the generator includes a trained affine parameter matrix. The computer device may perform translation, scaling, rotation, and inversion transform on the identity feature vector based on the affine parameter matrix. For example, the computer device may perform a modulation operation (Mod) and a demodulation operation (Demod) on the first convolutional layer of the current convolutional layer by using the first control vector, to obtain a second convolution kernel. The modulation operation may be scaling processing on a convolution kernel weight of the current convolutional layer, and the demodulation operation may be normalization processing on a convolution kernel weight obtained after the scaling processing. For example, the computer device may perform scaling processing on the convolution kernel weight by using the first control vector and a measure ratio corresponding to a first feature map that is inputted to the current convolutional layer.

In some embodiments, the computer device obtains a control mask of a corresponding measure based on the second feature map and an initial attribute feature of the corresponding measure inputted to the current convolutional layer. The process may include: the computer device performs feature concatenation on the second feature map and the initial attribute feature to obtain a concatenated feature map; and the computer device maps the concatenated feature map to the control mask based on a preconfigured mapping convolution kernel and an activation function. For example, the control mask is a binary image. In the binary image, a value of a pixel that carries a feature other than the identity feature of the target face, for example, a value of a pixel in a hair region or a pixel in a background region is 1, and a value of a pixel that carries the identity feature is 0. For example, the mapped convolution kernel may be a convolution kernel of 1×1, and the activation function may be a Sigmoid function. For example, the second feature map and the initial attribute feature may be represented as feature vectors. The computer device may perform a combination operation on a feature vector corresponding to the second feature map and a feature vector corresponding to the initial attribute feature to obtain the concatenation vector, and perform a convolution operation and an activation operation on the concatenation vector to obtain the control mask.

Figure 4:
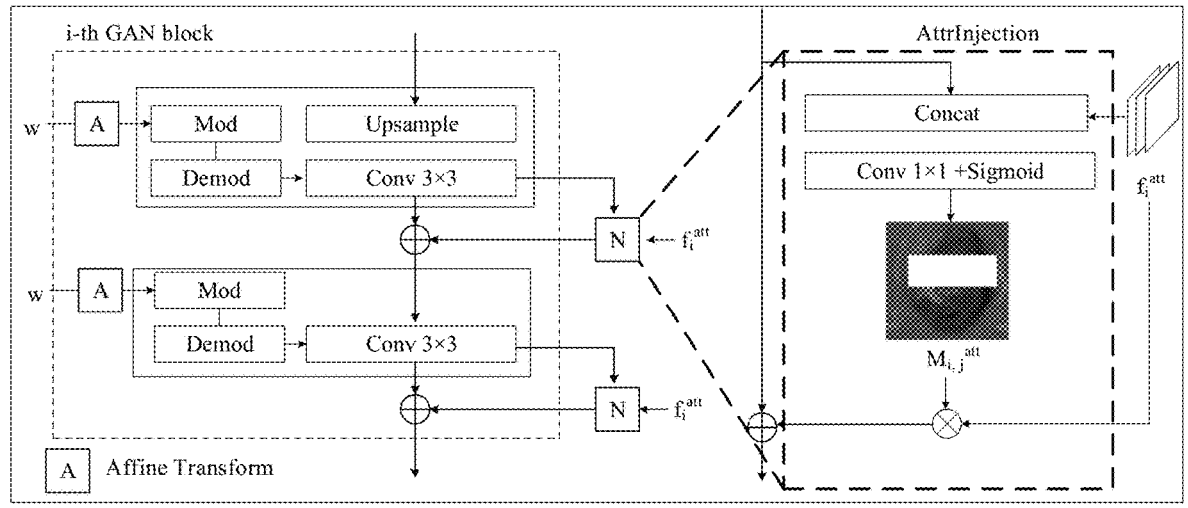
FIG. 4 is a schematic structural diagram of a block in a generator according to an embodiment of this application.

For example, the generator may include a plurality of blocks, and each block includes a plurality of layers. The computer device inputs the identity feature and the initial attribute feature of each measure to a block of a corresponding measure. In the block, at least one layer may be used for performing layer-by-layer processing on the inputted identity feature and initial attribute feature. For example, FIG. 4 is a network structure of an ith block (i-th GAN block) in a generator, where N represents an attribute injection module (AttrInjection), and an internal structure of the attribute injection module is enlarged and displayed in a dashed line box on the right side. As shown in FIG. 4, the ith block includes two layers, and the first layer is used as an example for description. In FIG. 4, the left w represents an identity feature $f_{id}$ of a source image, and A represents an affine transform operation. After an affine transform operation is performed on an identity feature vector, a first control vector is obtained. In FIG. 4, Mod and Demod indicate that modulation and demodulation operations are performed on a convolution kernel Cony 3×3. After performing an upsampling operation on a first feature map that is of a current layer and that is inputted to a current block, the computer device performs a convolution operation on the upsampled first feature map by using the convolution kernel Cony 3×3 obtained after the Mod and Demod operations, to obtain a second feature map. Then, the computer device performs a concatenation (Concat) operation on the second feature map and an initial attribute feature $f_i^{att}$ inputted to the current block, and maps the concatenated feature vector obtained by means of concatenation to a control mask $M_{i,j}^{att}$ corresponding to the current layer by using the convolution kernel Cony 1×1 and the Sigmoid function.

Step S3: The computer device screens the initial attribute feature based on the control mask to obtain the target attribute feature.

The computer device may perform point multiplication on the feature vector corresponding to the control mask and the feature vector corresponding to the initial attribute feature to obtain the target attribute feature in the initial attribute feature.

As shown in FIG. 4, the computer device may perform point multiplication on the control mask $M_{i,j}^{att}$ and the initial attribute feature $f_i^{att}$, and add a feature vector obtained by means of point multiplication to the feature vector corresponding to the second feature map to obtain the target attribute feature.

Step S4: The computer device generates a third feature map based on the target attribute feature and the second feature map, and outputs the third feature map to a next convolutional layer of the current convolutional layer, so as to serve as a first feature map of the next convolutional layer.

The computer device adds the feature vector corresponding to the second feature map and the feature vector corresponding to the target attribute feature to obtain the third feature map.

For each convolutional layer included in the generator, the computer device may repeatedly perform the foregoing step S1 to step S4 until the foregoing step S1 to step S4 are repeatedly performed on the last convolutional layer of the generator to obtain a third feature map outputted by the last convolutional layer, and generate the target face change image based on the third feature map outputted by the last convolutional layer.

As shown in FIG. 4, if the ith block includes two layers, the third feature map may be inputted to the second layer of the ith block, operations of the first layer are repeated, and a feature map obtained by the second layer is outputted to a next block, and so on until the last block. As shown in FIG. 3, N represents an attribute injection module (AttrInjection module), and a dashed line box represents a generator that uses a StyleGAN2 model. For N blocks included in the generator, an identity feature fa of a source image $X_s$ is respectively inputted, and corresponding initial attribute features $f_1^{att}, f_2^{att}, \ldots, f_i^{att}, \ldots, f_{N-1}^{att}$, and $f_N^{att}$ are respectively inputted to the N blocks by using the attribute injection module. The process of step S1 to step S4 is performed in each block until a feature map outputted by the last block is obtained, and a final target face change image $Y_{s,t}$ is generated based on the feature map outputted by the last block, so as to complete face change.

Figure 5:
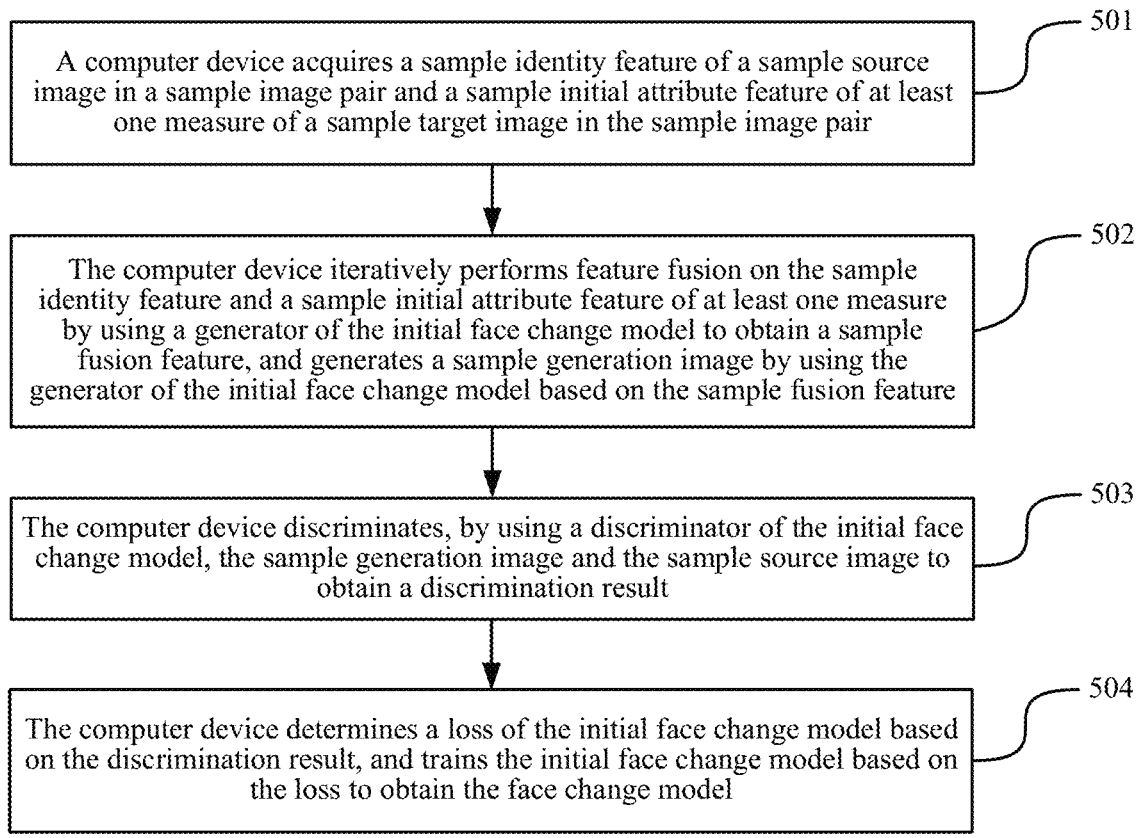
FIG. 5 is a schematic flowchart of a face change model training method according to an embodiment of this application.

FIG. 5 is a schematic flowchart of a face change model training method according to an embodiment of this application. The method may be performed by a computer device. As shown in FIG. 5, the method includes the following steps:

Step 501: The computer device acquires a sample identity feature of a sample source image in a sample image pair and a sample initial attribute feature of at least one measure of a sample target image in the sample image pair.

In one embodiment, the computer device acquires a sample data set, where the sample data set includes at least one sample image pair, and the computer device trains a face change model by using the sample data set. Each sample image pair includes one sample source image and one sample target image. In some embodiments, the sample image pair may include a first sample image pair and a second sample image pair, where the first sample image pair includes a sample source image and a sample target image belonging to the same object, and the second sample image pair includes a sample source image and a sample target image belonging to different objects. For example, the sample image pair includes a first sample image pair including a source image $X_s$ and a target image $X_t$ of an object A, and also includes a second sample image pair including a source image $X_s$ of the object A and a target image $X_t$ of an object B. A true value label is marked on both the first sample image pair and the second sample image, and the true value label represents whether a corresponding source image and a corresponding target image are the same object.

Herein, the sample identity feature of the sample source image and the sample initial attribute feature of the sample target image may be acquired by using an initial face change model. In some embodiments, the initial face change model may include an initial identity recognition network and an attribute feature map extraction network, and the computer device may separately extract the sample identity feature of the sample source image and a sample initial attribute feature of at least one measure of the sample target image by using the initial identity recognition network and the attribute feature map extraction network. An implementation of acquiring the sample identity feature and the sample initial attribute feature herein is a process similar to a method of acquiring the identity feature and the initial attribute feature in step 201, and details are not described herein again.

Step 502: The computer device iteratively performs feature fusion on the sample identity feature and a sample initial attribute feature of at least one measure by using a generator of the initial face change model to obtain a sample fusion feature, and generates a sample generation image by using the generator of the initial face change model based on the sample fusion feature.

In some embodiments, the generator of the initial face change model determines a sample mask of the at least one measure based on the sample identity feature of the sample source image and the sample initial attribute feature of the at least one measure of the sample target image, and generates a sample image corresponding to the sample image pair based on the sample identity feature, the sample mask of the at least one measure, and the sample initial attribute feature of the at least one measure.

The generator includes a plurality of convolutional layers. For each sample image pair, the computer device may input the sample identity feature into each convolutional layer, input the sample initial attribute feature of the at least one measure into a convolutional layer that matches the measure of the sample initial attribute feature, and perform layer-by-layer processing on each convolutional layer to obtain the sample generation image.

For example, the computer device may perform the following steps on the inputted sample identity feature and sample initial attribute feature of a corresponding measure by using each convolutional layer of the generator: The computer device acquires a first sample feature map outputted by a previous initial convolutional layer of a current initial convolutional layer; generates a second sample feature map based on the sample identity feature and the first sample feature map, and determines a sample mask of the sample target image at a corresponding measure based on the second sample feature map and the sample initial attribute feature; the computer device screens the sample initial attribute feature based on the sample mask to obtain a sample target attribute feature; and the computer device generates a third sample feature map based on the sample target attribute feature and the second sample feature map, and outputs the third sample feature map to a next convolutional layer of the current convolutional layer, so as to serve as a first sample feature map of the next convolutional layer. By analogy, until the foregoing steps are repeatedly performed on the last convolutional layer of the generator, a third feature map outputted by the last convolutional layer is obtained, and a sample generation image is obtained based on the initial feature map outputted by the last convolutional layer.

In a model training phase, steps performed by using each convolutional layer are the same process as steps (that is, the foregoing steps S1-S4) performed by each convolutional layer in the trained face change model generator, and details are not described herein again.

Step 503: The computer device discriminates, by using a discriminator of the initial face change model, the sample generation image and the sample source image to obtain a discrimination result.

Herein, the sample source image and the sample generation image in the sample image pair are inputted to the discriminator of the initial face change model, to obtain discrimination results of the sample source image and the sample generation image that are respectively generated by the discriminator.

The initial face change model may further include a discriminator. For each sample image pair, the computer device inputs the sample source image and the sample generation image to the discriminator, and outputs a first discrimination result of the sample source image and a second discrimination result of the sample generation image. The first discrimination result may represent a probability that the sample source image is a real image. The second discrimination result may represent a probability that the sample generation image is a real image.

In some embodiments, the discriminator includes at least one convolutional layer. Each convolutional layer may be configured to process a discrimination feature map outputted from a previous convolutional layer of the discriminator and output it to a next convolutional layer of the discriminator. Each convolutional layer may output a discrimination feature map for performing feature extraction on the sample source image and a discrimination feature map for performing feature extraction on the sample generation image, until the last convolutional layer of the discriminator, and a first discrimination result is obtained based on a discrimination feature map of a sample source image outputted by the last convolutional layer. A second discrimination result is obtained based on a discrimination feature map of a sample generation image outputted by the last convolutional layer.

Step 504: The computer device determines a loss of the initial face change model based on the discrimination result, and trains the initial face change model based on the loss to obtain the face change model.

For each sample image pair, the computer device determines a first loss value based on a sample mask of at least one measure of a sample target image in the sample image pair, determines a second loss value based on discrimination results (that is, the first discrimination result and the second discrimination result) of a sample source image and a sample generation image respectively, obtains a total training loss based on the first loss value and the second loss value, and trains an initial face change model based on the total training loss until a target condition is met and training stops, to obtain a face change model.

In one embodiment, the computer device may accumulate a sample mask of at least one measure, and use an accumulative value corresponding to the sample mask of at least one measure as the first loss value. For example, the sample mask may be a binary image. The computer device accumulates values of pixels in the binary image to obtain a first sum value corresponding to each sample mask, and accumulates a first sum value corresponding to at least one measure of the sample mask to obtain a first loss value.

For example, the generator includes at least one initial block, and each initial block includes at least one layer. For each sample image pair, the computer device may determine a first loss value based on a sample mask of at least one measure of a sample target image in each sample image pair by using the following formula 1:

$$L_{mask}=\Sigma_{i,j}|M_{i,j}|_1;\qquad\text{Formula 1}$$

where $L_{mask}$ represents the first loss value, i represents an ith block of the generator, and j represents a jth layer of the ith block. $M_{i,j}$ represents a sample mask of the jth layer of the ith block. The computer device may accumulate a sample mask of at least one layer of at least one block by using the foregoing formula 1, and in a training phase, the first loss value $L_{mask}$ is minimized to train the generator, so that a control mask obtained can effectively represent a pixel of a key attribute feature other than an identity feature, and then the control mask can be used for selecting a key attribute feature in an initial attribute feature, filtering out a redundant feature in the initial attribute feature, and retaining a key and necessary feature in the initial attribute feature, so as to avoid a redundancy attribute, and finally improve accuracy of a generated face change image.

Figure 6:
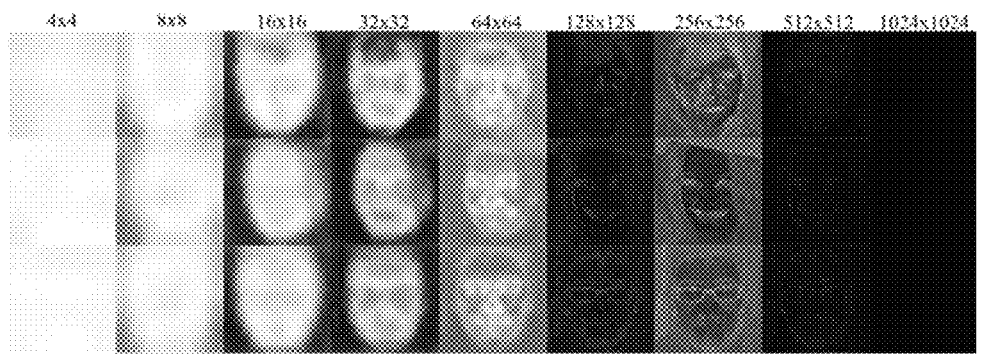
FIG. 6 is a schematic diagram of a control mask of at least one measure according to an embodiment of this application.

Pixels that carry features other than the identity feature of the target face and that are represented by binary images of different measures have different degrees of refinement. FIG. 6 shows sample masks of different measures respectively corresponding to three target images, and each row of sample masks is sample masks of various measures corresponding to one of the target images. As shown in FIG. 6, for any target image, resolutions of sample masks from left to right increase in sequence. A sample mask change of each measure in the first row is used as an example. From 4×4, 8×8, 16×16, and 32×32, a position of a face in the target image is gradually clearly located, where a value of a pixel corresponding to a face region is 0, and a value of a pixel corresponding to a background region other than the face region is 0. From 64 λ64, 128×128, 16×16, 256×256, 512×512, and 1024×1024, a pose expression of the face in the target image is gradually clarified, and facial details of the face in the target image are gradually presented.

For example, the computer device may determine the second loss value based on the discrimination results of the discriminator on the sample source image and the sample generation image by using the following formula 2:

$$L_{GAN} = \min_{G}\max_{D} E[\log(D(X_s))] + E[\log(1 - D(Y_{s,t}))];\qquad\text{Formula 2}$$

where L GAN represents the second loss value, $D(X_s)$ represents the first discrimination result of the sample source image by the discriminator, and the first discrimination result may be a probability that the sample source image $X_s$ is a real image. $D(Y_{s,t})$ indicates the second discrimination result of the sample generation image $Y_{s,t}$ by the discriminator, and the second discrimination result may be a probability that the sample generation image is a real image. $E[\log(D(X_s))]$ refers to an expectation of $\log(D(X_s))$, and may represent a loss value of the discriminator. $E[\log(1-D(Y_{s,t}))]$ refers to an expectation of $\log(1-D(Y_{s,t}))$, and may represent a loss value of the generator. $\min_G$ represents the generator's expectation of minimizing the loss function value, and $\max_D$ represents maximizing the loss function value by the discriminator. The initial face change model includes a generator and a discriminator, and may be an adversarial network. The adversarial network learns a desired machine learning model in a manner in which the generator and the discriminator play a game with each other, and is an unsupervised learning method. A training objective of the generator is to obtain an expected output according to an input. A training objective of the discriminator is to distinguish, as far as possible, an image generated by the generator from a real image. An input to the discriminator includes a sample source image and a sample generation image generated by the generator. Two network models learn from each other in an adversarial manner, and constantly adjust parameters. An ultimate objective is that an initiator deceives the discriminator as much as possible, so that the discriminator cannot determine whether the image generated by the generator is real.

In some embodiments, the computer device may use the sum of the first loss value and the second loss value as the total training loss.

In some embodiments, the computer device may further perform training based on a sample image of the same object. Before the computer device determines the total training loss, the computer device acquires a third loss value corresponding to the first sample image pair based on the sample generation image and the sample target image in the first sample image pair. The step of determining, by the computer device, the total training loss may include: The computer device obtains the total training loss based on the third loss value corresponding to the first sample image pair, the first loss value and the second loss value corresponding to the sample image pair.

For example, the computer device may acquire the third loss value based on the sample generation image and the sample target image in the first sample image pair by using the following formula 3:

$$L_{rec}=|Y_{s,t}-X_t|_1; \qquad \text{Formula 3}$$

$L_{rec}$ represents the third loss value, $Y_{s,t}$ represents the sample generation image corresponding to the first sample image pair, and $X_t$ represents the sample target image in the first sample image pair. When the sample source image and the sample target image belong to the same object, a face change result may be constrained to be the same as the sample target image, so that when the trained face change model performs face change on an image of the same object, the generated face change image is close to the target image, so as to improve model training accuracy.

In some embodiments, the discriminator includes at least one convolutional layer. The computer device may perform loss calculation based on an output result of each convolutional layer of the discriminator. Before determining the total training loss, the computer device determines a first similarity between a non-face region of a first discrimination feature map and a non-face region of a second discrimination feature map for each sample image pair, where the first discrimination feature map is a feature map corresponding to a sample target image outputted by a first part of at least one convolutional layer, and the second discrimination feature map is a feature map of a sample generation image outputted by the first part of the convolutional layer; the computer device determines a second similarity between a third discrimination feature map and a fourth discrimination feature map, the third discrimination feature map being a feature map of a sample target image outputted by a second part of the convolutional layer, and the fourth discrimination feature map being a feature map of a sample generation image outputted by the second part of the convolutional layer; and the computer device determines a fourth loss value based on the first similarity and the second similarity that are corresponding to each sample image pair. The step of determining the total training loss may include: The computer device obtains the total training loss based on the first loss value, the second loss value, and the fourth loss value.

For example, the computer device may determine the first similarity by using a trained segmentation model. For example, the computer device may acquire a segmentation mask of the first discrimination feature map or the second discrimination feature map by using the segmentation model, and determine the first similarity between the non-face region of the first discrimination feature map and the non-face region of the second discrimination feature map based on the segmentation mask. The segmentation mask may be a binary image of the first discrimination feature map or the second discrimination feature map, and a value of a pixel corresponding to a non-face region in the binary image is 1, and a value of a pixel corresponding to a region other than the face region is 0, so that a background region other than the face is effectively extracted.

For example, the computer device may determine, by using the following formula 4, a fourth loss value corresponding to the sample image pair:

$$L_{FM}=\Sigma_{i=1}^{m}M_{bg}\cdot|D^i(X_t)-D^iY_{s,t})|_2+0.1*\Sigma_{j=m}^{M}|D^j(X_t)-D^j(Y_{s,t})|_2; \qquad \text{Formula 4}$$

where $L_{FM}$ represents the fourth loss value, $M_{bg}$ represents the segmentation mask, and the discriminator includes M convolutional layers, where the first to an mth convolutional layers are a first part of convolutional layer, and the mth to an Mth convolutional layer are a second part of convolutional layer. $D^i(X_t)$ represents a feature map of a sample target image outputted from an ith convolutional layer in the first part of convolutional layer; $D^i(Y_{s,t})$ represents a feature map of a sample generation image outputted from the ith convolutional layer in the first part of convolutional layer; $D^j(X_t)$ represents a feature map of a sample target image outputted from a jth convolutional layer in the second part of convolutional layer; and $D^j(Y_{s,t})$ represents a feature map of a sample generation image outputted from the jth convolutional layer in the second part of convolutional layer. A value of m is a positive integer not less than 0 and not greater than M, and the value of m may be configured based on a requirement. This is not limited in this application.

In some embodiments, the computer device may further separately acquire a similarity between identity features of images to perform loss calculation. For example, before determining the total training loss, for each sample image pair, the computer device may separately extract a first identity feature of the sample source image, a second identity feature of the sample target image, and a third identity feature of the sample generation image; determine a first identity similarity between the sample source image and the sample generation image based on the first identity feature and the third identity feature; the computer device determines a first identity distance between the sample generation image and the sample target image based on the second identity feature and the third identity feature, and determines a second identity distance between the sample source image and the sample target image based on the first identity feature and the second identity feature; the computer device may determine a distance difference based on the first identity distance and the second identity distance; and the computer device determines a fifth loss value corresponding to each sample image pair based on the first identity similarity and the distance difference that are corresponding to each sample image pair. The step of determining, by the computer device, the total training loss may include: The computer device obtains the total training loss based on the first loss value, the second loss value, and the fifth loss value.

For example, the computer device may determine the fifth loss value by using the following formula 5:

$$L_{ICL}=1-\cos(z_{id}(Y_{s,t})z_{id}(X_s))+(\cos(z_{id}(Y_{s,t})z_{id}(X_t))-\cos(z_{id}(X_s),z_{id}(X_t)))^2;$$  Formula 5 where $L_{ICL}$ represents the fifth loss value, $z_{id}(X_s)$ represents the first identity feature of the sample source image, $z_{id}(X_t)$ represents the second identity feature of the sample target image, and $z_{id}(Y_{s,t})$ represents the third identity feature of the sample generation image; $1-\cos(z_{id}(Y_{s,t}),z_{id}(X_s))$ represents the first identity similarity between the sample source image and the sample generation image; $\cos(z_{id}(Y_{s,t}),z_{id}(X_t))$ represents the first identity distance between the sample generation image and the sample target image; $\cos(z_{id}(X_s),z_{id}(X_t))$ represents the second identity distance between the sample source image and the sample target image; and $(\cos(z_{id}(Y_{s,t}),z_{id}(X_t))-\cos(z_{id}(X_s),z_{id}(X_t)))^2$ represents the distance difference.

The distance difference is determined by using the first identity distance and the second identity distance. Because the distance between the sample source image and the sample target image is measured by using the second identity distance, the distance difference is minimized, so that the first identity distance, that is, a distance exists between the sample generation image and the sample target image, and the distance is equivalent to a distance between the sample source image and the sample target image. By using the first identity similarity, it is ensured that the generated image has the identity feature of the target image. Therefore, model training accuracy is improved, and face change accuracy is improved.

For example, the total training loss includes the foregoing five loss values. The computer device may determine the total training loss by using the following formula 6:

$$L_{total}=L_{GAN}+L_{mask}+L_{FM}+10*L_{rec}+5*L_{ICL};$$  Formula 6 where $L_{total}$ represents the total training loss, L GAN represents the second loss value, $L_{mask}$ represents the first loss value, $L_{FM}$ represents the third loss value, $L_{FM}$ represents the fourth loss value, and $L_{ICL}$ represents the fifth loss value.

In one embodiment, the computer device trains the initial face change model based on the total training loss until the target condition is met and training stops, to obtain the face change model.

Based on the foregoing step 501 to step 504, the computer device may perform iterative training on the initial face change model, obtain a total training loss corresponding to each iterative training, and adjust a parameter of the initial face change model based on the total training loss of each iterative training, for example, optimize parameters included in an encoder, a decoder, a generator, and a discriminator in the initial face change model, until the total training loss meets the target condition, the computer device stops training and uses the last optimized initial face change model as the face change model. For example, the computer device may perform iterative training on the initial face change model by using an Adam algorithm optimizer and by using a learning rate of 0.0001, until the target condition is reached, it is considered that the training reaches convergence, and training is stopped. For example, the target condition may be that a value of a total loss is within a target value range, for example, the total loss is less than 0.5. Alternatively, time consumed for a plurality of times of iterative training exceeds maximum duration, and the like.

FIG. 3 is a schematic framework diagram of a face change model according to an embodiment of this application. As shown in FIG. 3, the computer device may use a face image of an object A as a source image $X_s$, and use a face image of an object B as a target image $X_t$. The computer device obtains an identity feature $f_{id}$ of the source image by using a fixed face recognition network (Fixed FR Net), and the computer device separately inputs the identity feature $f_{id}$ into N blocks included in the generator. The computer device acquires initial attribute features $f_1^{att}, f_2^{att}, \ldots, f_i^{att}, \ldots, f_{N-1}^{att}$, and $f_N^{att}$ of at least one measure of the target image by using the encoder and the decoder of the U-shaped deep network structure, and inputs them into blocks of corresponding measures respectively. The computer device performs the foregoing process of step S1 to step S4 on each block until a feature map outputted by the last block is obtained. The computer device generates a final target face change image $Y_{s,t}$ based on the feature map outputted by the last block, so as to complete face change.

According to the image processing method in this application, high-definition face change can be implemented, for example, a high-resolution face change image such as $1024^2$ may be generated. In addition, high image quality and identity consistency with a source face in a source image are ensured in the generated high-resolution face change image, and a key attribute of a target face in a target image is effectively retained with high precision. In a method A in a related art, only a face change image with a low resolution such as $256^2$ can be generated. In the image processing method in this application, an initial attribute feature of at least one measure and an identity feature are processed in layer convolution of a generator, and an initial attribute feature is screened by using a control mask of at least one measure, so that redundant information such as an identity feature of the target face is effectively filtered out from an obtained target attribute feature, thereby effectively retaining a key attribute feature of the target face. In addition, the initial attribute feature of the at least one measure is highlighted to correspond to features of different measures. By using a control mask of a larger measure corresponding to an initial attribute feature of a larger measure, high-definition screening of key attributes can be implemented, so that facial detail features such as a hairline, a wrinkle, and a facial occlusion of the target face are retained with high precision, greatly improving precision and clarity of a generated face change image, and improving reality of the face change image.

In addition, the image processing method in this application can directly generate an entire face change image after face change, where the entire face change image includes both a face after face change and a background region, and processing such as fusion or enhancement in a related art is not required. Processing efficiency of the face change process is greatly improved.

In addition, in the face change model training method in this application, during model training, end-to-end training may be performed on an entire generation framework that is in the initial face change model and that is used for generating a sample generation image, thereby avoiding error accumulation due to multi-phase training, so that the face change model in this application can more stably generate a face change image, and stability and reliability of the face change process are improved.

In addition, the image processing method in this application can generate a face change image with a higher resolution, and accurately retain details such as texture, skin brightness, and hairline of the target face in the target image, so as to improve precision, clarity, and reality of face change, and can be applied to a scenario in which there is a higher requirement on face change quality, such as a game or a movie. In addition, for a virtual image maintenance scenario, in the image processing method in this application, a face of any object can be replaced with a face of any object. For a specific virtual image, a face of the specific virtual image is replaced with a face of any object, which facilitates maintenance of the virtual image and improves convenience of maintenance of the virtual image.

The following compares and shows a face change result of the image processing method in this application with a face change result of a related art. It can be learned from comparison that the high-definition face change result generated by the image processing method in this application shows obvious superiority over the related art in qualitative and quantitative comparison.

Figure 7:
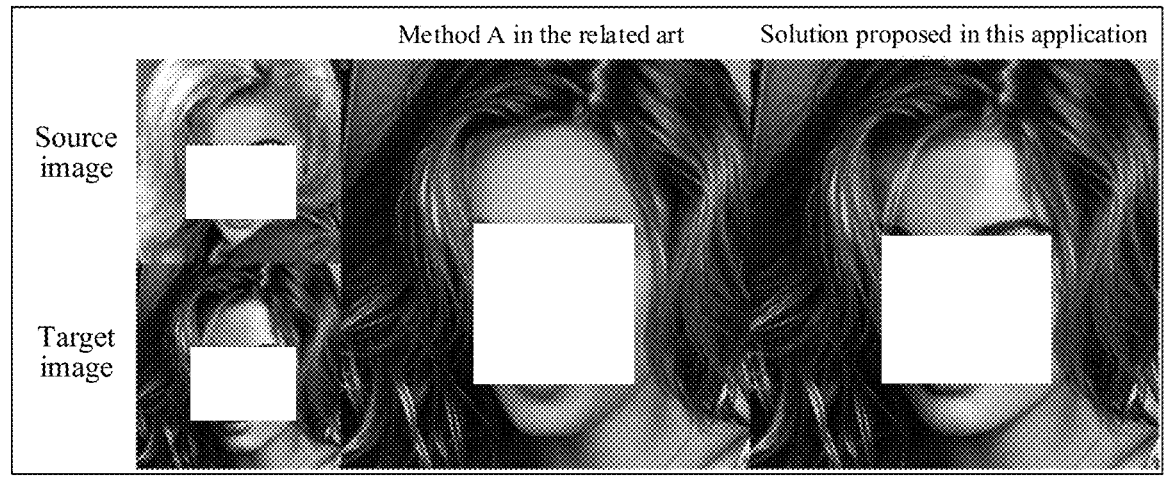
FIG. 7 is a schematic diagram of face change result comparison according to an embodiment of this application.

FIG. 7 shows comparison between some methods (hereinafter referred to as a method A) in a related art and a high-definition face change result of a solution provided in this application. It can be seen from comparison that, in the method A, obvious inconsistency of skin brightness occurs, and hairline occlusion of a face cannot be retained. A result generated by the solution provided in this application retains attribute features such as skin brightness, expression, skin texture, and occlusion of a target human face, and has better image quality and is also more real.

Table 1 below shows quantitative comparison between the method A in the related art and the high-definition face change result of the solution provided in this application. Experimental data in Table 1 compares an identity similarity (ID Retrieval) between a face in a generated face change image and a face in a source image, a pose difference (Pose Error) between the face in the face change image and a face in a target image, and an image quality difference (FID) between the face in the face change image and a real face image. It may be learned from the experimental data in Table 1 that the identity similarity of the high-definition face change result of the solution provided in this application is significantly higher than that of the method A in the related art. The pose difference of the high-definition face change result of the solution proposed in this application is lower than that of the method A in the related art, and a pose difference of the solution in this application is lower. A picture quality difference of the high-definition face change result of the solution proposed in this application is obviously lower than that of the method A in the related art, and the picture quality difference between the face change image obtained in the solution of this application and the real picture is relatively small. Therefore, the solution provided in this application takes into consideration image quality, identity consistency with the source face, and retaining of the attribute of the target face, and has a significant advantage over the method A in the related art.

TABLE 1

| | ID Retrieval ↑ | Pose Error ↓ | FID ↓ |
|---|---|---|---|
| Method A in the related art | 90.83 | 2.64 | 16.64 |
| Solution proposed in this application | 96.34 | 2.52 | 2.04 |

According to the image processing method in this embodiment of this application, an identity feature of a source image and an initial attribute feature of at least one measure of a target image are obtained. The identity feature is inputted into a generator in a trained face change model, and the initial attribute feature of the at least one measure is separately inputted into a convolutional layer of a corresponding measure in the generator to obtain a target face change image. In each convolutional layer of the generator, a second feature map may be generated based on the identity feature and a first feature map outputted by a previous convolutional layer. A control mask of the target image at a corresponding measure is determined based on the second feature map and the initial attribute feature, so as to accurately locate a pixel of the target image that carries a feature other than the identity feature of the target face. A target attribute feature in the initial attribute feature is selected based on the control mask, a third feature map is generated based on the target attribute feature and the second feature map, and is outputted to a next convolutional layer. The third feature map is processed by at least one convolutional layer, so that an attribute and a detail feature of a target face are effectively reserved in a final target face change image. This greatly improves a definition of a face in the face change image, implements high definition face change, and improves precision of face change.

Figure 8:
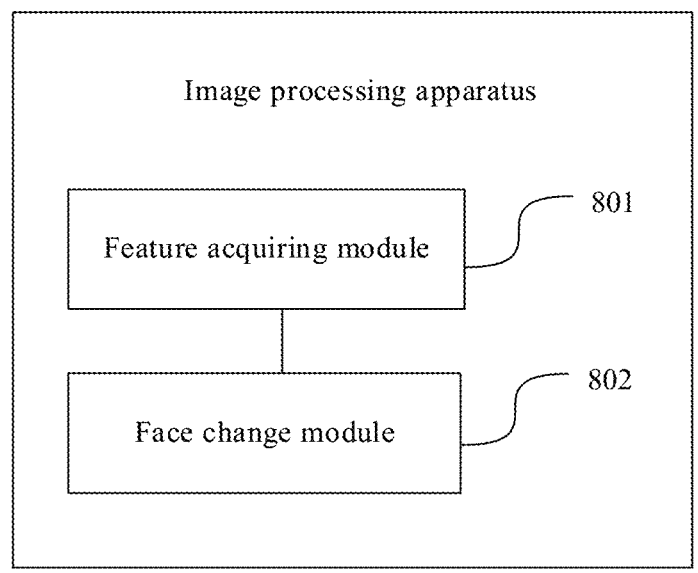
FIG. 8 is a schematic structural diagram of an image processing apparatus according to an embodiment of this application.

FIG. 8 is a schematic structural diagram of an image processing apparatus according to an embodiment of this application. As shown in FIG. 8, the apparatus includes:
 a feature acquiring module 801, configured to acquire an identity feature of a source image and an initial attribute feature of at least one measure of a target image in response to a received face change request;
 the face change request being used for requesting to replace a target face in the target image with a source face in the source image, the identity feature representing an object to which the source face belongs, and the initial attribute feature representing a three-dimensional attribute of the target face; and
 a face change module 802, configured to input the identity feature and the initial attribute feature of the at least one measure into a face change model;
 iteratively perform feature fusion on the identity feature and the initial attribute feature of the at least one measure by using the face change model to obtain a fusion feature; and generate a target face change image based on the fusion feature by using the face change model, and output the target face change image;

a face in the target face change image being fused with an identity feature of the source face and a target attribute feature of the target face.

In some embodiments, the face change model includes at least one convolutional layer, each of which corresponds to one measure; and the convolutional layer of the face change module 802 includes an acquiring unit, a generation unit, and an attribute screening unit.

The acquiring unit is configured to acquire a first feature map outputted by a previous convolutional layer of a current convolutional layer;

the generation unit is configured to generate a second feature map based on the identity feature and the first feature map;

the attribute screening unit is configured to select a target attribute feature from the initial attribute feature of the at least one measure, the target attribute feature being a feature other than an identity feature of the target face; and the generation unit is further configured to: generate a third feature map based on the target attribute feature and the second feature map, and output the third feature map to a next convolutional layer of the current convolutional layer, so as to serve as a first feature map of the next convolutional layer; and determine, as the fusion feature, a third feature map outputted by the last convolutional layer in the at least one convolutional layer.

In some embodiments, the convolutional layer of the face change module 802 further includes:

a control mask determining unit, configured to determine a control mask of the target image at a corresponding measure based on the second feature map and the initial attribute feature;

the control mask being used for representing a pixel that carries a feature other than the identity feature of the target face; and the generation unit is further configured to screen the initial attribute feature of the at least one measure based on the control mask to obtain the target attribute feature.

In some embodiments, the control mask determining unit is further configured to perform feature concatenation on the second feature map and the initial attribute feature to obtain a concatenated feature map; and map the concatenated feature map to the control mask based on a preconfigured mapping convolution kernel and an activation function.

In some embodiments, both the initial attribute feature and a quantity of convolutional layers are a target quantity, the convolutional layers of the target quantity are connected in series, different initial attribute features are corresponding to different measures, each convolutional layer is corresponding to an initial attribute feature of one measure, and the target quantity is greater than or equal to two; and the acquiring unit is further configured to: acquire an initial feature map when the current convolutional layer is the first convolutional layer in the convolutional layers of the target quantity, and use the initial feature map as a first feature map inputted to the current convolutional layer.

In some embodiments, the generation unit is further configured to perform affine transform on the identity feature to obtain a first control vector; and map a first convolution kernel of the current convolutional layer to a second convolution kernel based on the first control vector, and perform a convolution operation on the first feature map based on the second convolution kernel to generate the second feature map.

In some embodiments, when the apparatus trains the face change model, the apparatus further includes:

a sample acquiring module, configured to acquire a sample dataset, the sample dataset including at least one sample image pair, and each sample image pair including one sample source image and one sample target image;

a sample feature acquiring module, configured to acquire a sample identity feature of a sample source image in a sample image pair and a sample initial attribute feature of at least one measure of a sample target image in the sample image pair;

a generation module, configured to iteratively perform feature fusion on the sample identity feature and the sample initial attribute feature of the at least one measure by using a generator of an initial face change model to obtain a sample fusion feature; and generate a sample generation image based on the sample fusion feature by using the generator of the initial face change model;

a discrimination module, configured to discriminate, by using a discriminator of the initial face change model, the sample generation image and the sample source image to obtain a discrimination result;

a loss determining module, configured to determine a loss of the initial face change model based on the discrimination result; and a training module, configured to train the initial face change model based on the loss, to obtain the face change model.

In some embodiments, the discrimination result includes a first discrimination result for the sample source image and a second discrimination result for the sample generation image;

the loss determining module is further configured to: acquire a sample mask of at least one measure of a sample target image in each sample image pair, determine a first loss value based on the sample mask of the at least one measure, and determine a second loss value based on the first discrimination result and the second discrimination result; and the training module is further configured to train the initial face change model based on the total training loss until a target condition is met and training stops, to obtain the face change model.

In some embodiments, the sample source image and the sample target image are corresponding to the same object; and the loss determining module is further configured to acquire a third loss value based on the sample generation image and the sample target image; and obtain the total training loss based on the third loss value, the first loss value, and the second loss value.

In some embodiments, the discriminator includes at least one convolutional layer. The loss determining module is further configured to:

for each sample image pair, determine a first similarity between a non-face region of a first discrimination feature map and a non-face region of a second discrimination feature map, the first discrimination feature map being a feature map of a sample target image outputted by a first part of at least one convolutional layer, and the second discrimination feature map being a feature map of a sample generation image outputted by the first part of the convolutional layer;

determine a second similarity between a third discrimination feature map and a fourth discrimination feature map, the third discrimination feature map being a feature map of a sample target image outputted by a second part of the at least one convolutional layer, and the fourth discrimination feature map being a feature map of a sample generation image outputted by the second part of the convolutional layer;

determine a fourth loss value based on the first similarity and the second similarity; and obtain the total training loss based on the first loss value, the second loss value, and the fourth loss value.

In some embodiments, the loss determining module is further configured to:

for each sample image pair, separately extract a first identity feature of the sample source image, a second identity feature of the sample target image, and a third identity feature of the sample generation image;

determine a first identity similarity between the sample source image and the sample generation image based on the first identity feature and the third identity feature;

determine a first identity distance between the sample generation image and the sample target image based on the second identity feature and the third identity feature;

determine a second identity distance between the sample source image and the sample target image based on the first identity feature and the second identity feature;

determine a distance difference based on the first identity distance and the second identity distance;

determine a fifth loss value corresponding to each sample image pair based on the first identity similarity and the distance difference that are corresponding to each sample image pair; and obtain the total training loss based on the first loss value, the second loss value, and the fifth loss value.

According to the image processing apparatus in this embodiment of this application, an identity feature of a source image and an initial attribute feature of at least one measure of a target image are obtained. The identity feature is inputted into a generator in a trained face change model, and the initial attribute feature of the at least one measure is separately inputted into a convolutional layer of a corresponding measure in the generator to obtain a target face change image. In each convolutional layer of the generator, a second feature map may be generated based on the identity feature and a first feature map outputted by a previous convolutional layer. A control mask of the target image at a corresponding measure is determined based on the second feature map and the initial attribute feature, so as to accurately locate a pixel of the target image that carries a feature other than the identity feature of the target face. A target attribute feature in the initial attribute feature is selected based on the control mask, a third feature map is generated based on the target attribute feature and the second feature map, and is outputted to a next convolutional layer. The third feature map is processed by at least one convolutional layer, so that an attribute and a detail feature of a target face are effectively reserved in a final target face change image. This greatly improves a definition of a face in the face change image, implements high definition face change, and improves precision of face change.

Figure 9:
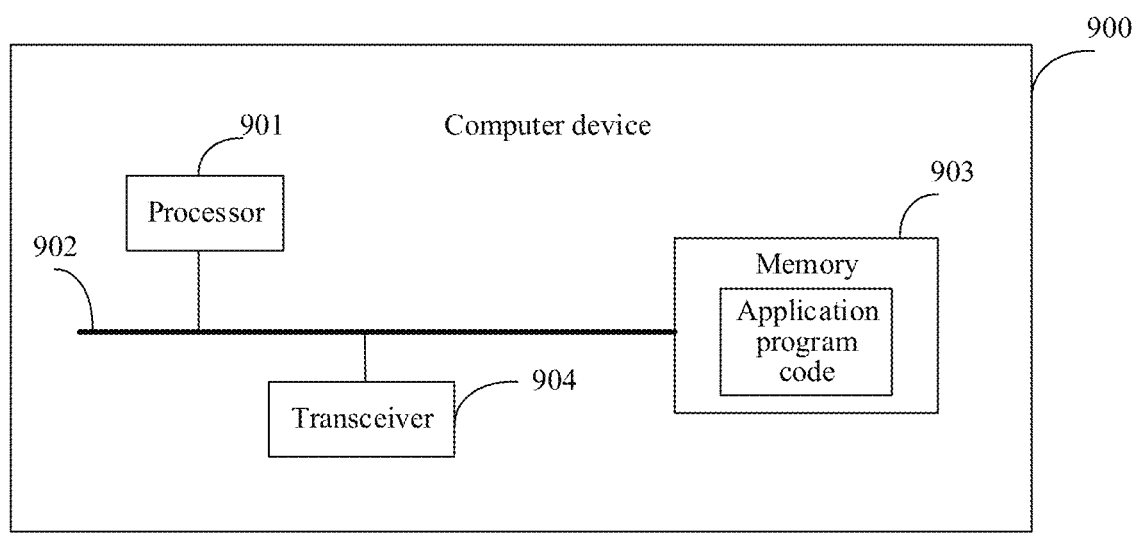
FIG. 9 is a schematic structural diagram of a computer device according to an embodiment of this application.

FIG. 9 is a schematic structural diagram of a computer device according to an embodiment of this application. As shown in FIG. 9, the computer device includes: a memory and a processor; the memory being configured to store a computer program; and the processor being configured to implement the computer program stored in the memory, performing the image processing method according to the embodiments of this application.

In some embodiments, a computer device is provided. As shown in FIG. 9, a computer device 900 shown in FIG. 9 includes a processor 901 and a memory 903. The processor 901 and the memory 903 are connected, for example, are connected by a bus 902. For example, the computer device 900 may further include a transceiver 904, and the transceiver 904 may be configured to exchange data between the computer device and another computer device, such as data sending and/or data receiving. In various embodiments, there may be one or more transceivers 904. The structure of the computer device 900 does not constitute a limitation on this embodiment of this application.

The processor 901 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or perform various examples of logic blocks, modules, and circuits described with reference to content disclosed in this application. The processor 901 may also be a combination that implements computing functions, for example, including a combination of one or more microprocessors or a combination of a DSP and a microprocessor.

The bus 902 may include a channel, to transmit information between the foregoing components. The bus 902 may be a peripheral component interconnect (Peripheral Component Interconnect, PCI) bus, an extended industry standard architecture (Extended Industry Standard Architecture, EISA) bus, or the like. The bus 902 may be classified into an address bus, a data bus, a control bus, and the like. For ease of description, the bus in FIG. 9 is represented by using only one bold line, but which does not indicate that there is only one bus or one type of bus.

The memory 903 may be a read-only memory (Read-Only Memory, ROM) or another type of static storage device capable of storing static information and instructions, a random access memory (Random Access Memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing the computer program and other medium read by a computer, but is not limited thereto.

The memory 903 is configured to store a computer program for performing the embodiments of this application, and the computer program is executed under control of the processor 901. The processor 901 is configured to execute the computer program stored in the memory 903 to implement the steps in any one of the foregoing method embodiments.

The electronic device includes but is not limited to a server, a terminal, or a cloud computing center device.

An embodiment of this application provides a computer-readable storage medium, storing a computer program, the computer program, when executed by a processor, implementing the steps and corresponding contents according to the foregoing method embodiments.

A computer program product is further provided in the embodiment of this application, including a computer program, the computer program, when executed by a processor, implementing the steps and corresponding contents according to the foregoing method embodiments.

In the specification, claims, and accompanying drawings of this application, the terms "first", "second", "third", "fourth", "one", "two", and the like (if existing) are intended to distinguish between similar objects rather than describe a specific sequence or a precedence order. It should be understood that the data so used may be interchanged in an appropriate condition, so that the embodiments of this application described herein can be implemented in an order other than those illustrated or described herein.

The foregoing descriptions are merely embodiments of some implementation scenarios in this application. For a person of ordinary skill in the art, another similar embodiment based on the technical idea of this application which is used without departing from the technical concept of the solution in this application also falls within the protection scope of the embodiments of this application.

What is claimed is:

1. An image processing method, performed by a computer device and comprising:
    acquiring an identity feature of a source image and an initial attribute feature of at least one measure of a target image in response to receiving a face change request, the face change request requesting to replace a target face in the target image with a source face in the source image, the identity feature representing an object to which the source face belongs, and the initial attribute feature representing a three-dimensional attribute of the target face;
    inputting the identity feature and the initial attribute feature of the at least one measure into a face change model, wherein the face change model comprises a plurality of convolutional layers, each convolutional layer corresponds to one of the at least one measure;
    iteratively performing feature fusion on the identity feature and the initial attribute feature of the at least one measure by using the plurality of convolution layers of the face change model to obtain a fusion feature, comprising:
        acquiring a first feature map outputted by a previous convolutional layer of a current convolutional layer;
        generating a second feature map based on the identity feature and the first feature map, and selecting a target attribute feature from the initial attribute feature of the at least one measure, the target attribute feature being a feature other than an identity feature of the target face;
        generating a third feature map based on the target attribute feature and the second feature map, the third feature map being a first feature map of a next convolutional layer of the current convolutional layer; and
        determining a third feature map outputted by the last convolutional layer in the plurality of convolutional layers as the fusion feature; and
    generating a target face change image based on the fusion feature by using the face change model, and outputting the target face change image, a face in the target face change image being fused with an identity feature of the source face and a target attribute feature of the target face.

2. The method according to claim 1, wherein the selecting a target attribute feature from the initial attribute feature of the at least one measure comprises:
    determining a control mask of the target image corresponding to a measure based on the second feature map and the initial attribute feature;
    the control mask representing a pixel that carries a feature other than the identity feature of the target face; and
    screening the initial attribute feature of the at least one measure based on the control mask to obtain the target attribute feature.

3. The method according to claim 2, wherein the determining a control mask of the target image corresponding to a measure based on the second feature map and the initial attribute feature comprises:
    performing feature concatenation on the second feature map and the initial attribute feature to obtain a concatenated feature map; and
    mapping the concatenated feature map to the control mask based on a mapping convolution kernel and an activation function.

4. The method according to claim 1, wherein both the initial attribute feature and a quantity of convolutional layers are a target quantity, the convolutional layers of the target quantity are connected in series, different initial attribute features correspond to different measures, each convolutional layer corresponds to an initial attribute feature of one measure, and the target quantity is greater than or equal to two; and
    the acquiring a first feature map outputted by a previous convolutional layer of a current convolutional layer comprises:
        acquiring an initial feature map when the current convolutional layer is the first convolutional layer in the convolutional layers of the target quantity, and using the initial feature map as a first feature map inputted to the current convolutional layer.

5. The method according to claim 1, wherein the generating a second feature map based on the identity feature and the first feature map comprises:
    performing affine transform on the identity feature to obtain a first control vector;
    mapping a first convolution kernel of the current convolutional layer to a second convolution kernel based on the first control vector; and
    performing a convolution operation on the first feature map based on the second convolution kernel, to generate the second feature map.

6. The method according to claim 1, wherein the method further comprises:
    acquiring a sample identity feature of a sample source image in a sample image pair and a sample initial attribute feature of at least one measure of a sample target image in the sample image pair;
    iteratively performing feature fusion on the sample identity feature and the sample initial attribute feature of the at least one measure by using a generator of an initial face change model to obtain a sample fusion feature;

generating a sample generation image based on the sample fusion feature by using the generator of the initial face change model;

discriminating, by using a discriminator of the initial face change model, the sample generation image and the sample source image to obtain a discrimination result; and determining a loss of the initial face change model based on the discrimination result, and training the initial face change model based on the loss to obtain the face change model.

7. The method according to claim 6, wherein the discrimination result comprises a first discrimination result for the sample source image and a second discrimination result for the sample generation image; and the determining a loss of the initial face change model based on the discrimination result comprises:

acquiring a sample mask of at least one measure of the sample target image, and determining a first loss value based on the sample mask of the at least one measure;

determining a second loss value based on the first discrimination result and the second discrimination result;

obtaining a total training loss based on the first loss value and the second loss value; and training the initial face change model based on the total training loss until a target condition is met and training stops, to obtain the face change model.

8. The method according to claim 7, wherein the sample source image and the sample target image correspond to a same object; and the obtaining a total training loss based on the first loss value and the second loss value comprises:

acquiring a third loss value based on the sample generation image and the sample target image; and obtaining the total training loss based on the third loss value, the first loss value, and the second loss value.

9. The method according to claim 7, wherein the discriminator comprises at least one convolutional layer; and the obtaining a total training loss based on the first loss value and the second loss value comprises:

determining a first similarity between a non-face region of a first discrimination feature map and a non-face region of a second discrimination feature map, the first discrimination feature map being a feature map of a sample target image outputted by a first part of the convolutional layer, and the second discrimination feature map being a feature map of a sample generation image outputted by the first part of the convolutional layer;

determining a second similarity between a third discrimination feature map and a fourth discrimination feature map, the third discrimination feature map being a feature map of a sample target image outputted by a second part of the convolutional layer, and the fourth discrimination feature map being a feature map of a sample generation image outputted by the second part of the convolutional layer;

determining a fourth loss value based on the first similarity and the second similarity; and obtaining the total training loss based on the first loss value, the second loss value, and the fourth loss value.

10. The method according to claim 7, wherein the obtaining a total training loss based on the first loss value and the second loss value comprises:

extracting a first identity feature of the sample source image, a second identity feature of the sample target image, and a third identity feature of the sample generation image;

determining a first identity similarity between the sample source image and the sample generation image based on the first identity feature and the third identity feature;

determining a first identity distance between the sample generation image and the sample target image based on the second identity feature and the third identity feature;

determining a second identity distance between the sample source image and the sample target image based on the first identity feature and the second identity feature;

determining a distance difference based on the first identity distance and the second identity distance;

determining a fifth loss value based on the first identity similarity and the distance difference; and obtaining the total training loss based on the first loss value, the second loss value, and the fifth loss value.

11. A computer device, comprising a memory and a processor, the memory being configured to store a computer program; and the processor being configured to execute the computer program stored in the memory to perform:

acquiring an identity feature of a source image and an initial attribute feature of at least one measure of a target image in response to receiving a face change request, the face change request requesting to replace a target face in the target image with a source face in the source image, the identity feature representing an object to which the source face belongs, and the initial attribute feature representing a three-dimensional attribute of the target face;

inputting the identity feature and the initial attribute feature of the at least one measure into a face change model, wherein the face change model comprises a plurality of convolutional layers, each convolutional layer corresponds to one of the at least one measure;

iteratively performing feature fusion on the identity feature and the initial attribute feature of the at least one measure by using the plurality of convolution layers of the face change model to obtain a fusion feature, comprising:

acquiring a first feature map outputted by a previous convolutional layer of a current convolutional layer;

generating a second feature map based on the identity feature and the first feature map, and selecting a target attribute feature from the initial attribute feature of the at least one measure, the target attribute feature being a feature other than an identity feature of the target face;

generating a third feature map based on the target attribute feature and the second feature map, the third feature map being a first feature map of a next convolutional layer of the current convolutional layer; and determining a third feature map outputted by the last convolutional layer in the plurality of convolutional layers as the fusion feature; and generating a target face change image based on the fusion feature by using the face change model, and outputting the target face change image, a face in the target face change image being fused with an identity feature of the source face and a target attribute feature of the target face.

12. The computer device according to claim 11, wherein the selecting a target attribute feature from the initial attribute feature of the at least one measure comprises:
  determining a control mask of the target image corresponding to a measure based on the second feature map and the initial attribute feature;
  the control mask representing a pixel that carries a feature other than the identity feature of the target face; and
  screening the initial attribute feature of the at least one measure based on the control mask to obtain the target attribute feature.

13. The computer device according to claim 12, wherein the determining a control mask of the target image corresponding to a measure based on the second feature map and the initial attribute feature comprises:
  performing feature concatenation on the second feature map and the initial attribute feature to obtain a concatenated feature map; and
  mapping the concatenated feature map to the control mask based on a mapping convolution kernel and an activation function.

14. The computer device according to claim 11, wherein both the initial attribute feature and a quantity of convolutional layers are a target quantity, the convolutional layers of the target quantity are connected in series, different initial attribute features correspond to different measures, each convolutional layer corresponds to an initial attribute feature of one measure, and the target quantity is greater than or equal to two; and
  the acquiring a first feature map outputted by a previous convolutional layer of a current convolutional layer comprises:
  acquiring an initial feature map when the current convolutional layer is the first convolutional layer in the convolutional layers of the target quantity, and using the initial feature map as a first feature map inputted to the current convolutional layer.

15. The computer device according to claim 11, wherein the generating a second feature map based on the identity feature and the first feature map comprises:
  performing affine transform on the identity feature to obtain a first control vector;
  mapping a first convolution kernel of the current convolutional layer to a second convolution kernel based on the first control vector; and
  performing a convolution operation on the first feature map based on the second convolution kernel, to generate the second feature map.

16. A non-transitory computer-readable storage medium, storing a computer program, the computer program, when executed by a processor, causing the processor to implement:
  acquiring an identity feature of a source image and an initial attribute feature of at least one measure of a target image in response to receiving a face change request, the face change request requesting to replace a target face in the target image with a source face in the source image, the identity feature representing an object to which the source face belongs, and the initial attribute feature representing a three-dimensional attribute of the target face;
  inputting the identity feature and the initial attribute feature of the at least one measure into a face change model, wherein the face change model comprises a plurality of convolutional layers, each convolutional layer corresponds to one of the at least one measure;
  iteratively performing feature fusion on the identity feature and the initial attribute feature of the at least one measure by using the plurality of convolution layers of the face change model to obtain a fusion feature, comprising:
    acquiring a first feature map outputted by a previous convolutional layer of a current convolutional layer;
    generating a second feature map based on the identity feature and the first feature map, and selecting a target attribute feature from the initial attribute feature of the at least one measure, the target attribute feature being a feature other than an identity feature of the target face;
    generating a third feature map based on the target attribute feature and the second feature map, the third feature map being a first feature map of a next convolutional layer of the current convolutional layer; and
    determining a third feature map outputted by the last convolutional layer in the plurality of convolutional layers as the fusion feature; and
  generating a target face change image based on the fusion feature by using the face change model, and outputting the target face change image, a face in the target face change image being fused with an identity feature of the source face and a target attribute feature of the target face.

17. The computer-readable storage medium according to claim 16, wherein the discrimination result comprises a first discrimination result for the sample source image and a second discrimination result for the sample generation image; and the determining a loss of the initial face change model based on the discrimination result comprises:
  acquiring a sample mask of at least one measure of the sample target image, and determining a first loss value based on the sample mask of the at least one measure;
  determining a second loss value based on the first discrimination result and the second discrimination result;
  obtaining a total training loss based on the first loss value and the second loss value; and
  training the initial face change model based on the total training loss until a target condition is met and training stops, to obtain the face change model.

* * * * *